United States Patent
Hartman et al.

(10) Patent No.: US 8,405,966 B2
(45) Date of Patent: Mar. 26, 2013

(54) MEMORY CARRIER AND IHS COUPLING SYSTEM

(75) Inventors: Corey D. Hartman, Hutto, TX (US); Brian T. Whitman, University Place, WA (US); Glen Patrick Gordon, Graham, WA (US); Jeffory L. Smalley, Olympia, WA (US); Michael Schrempp, Bainbridge Island, WA (US); Pete Ross, Olympia, WA (US); Russell Smith, Taylor, TX (US)

(73) Assignee: Dell Products L.P., Round Rock, TX (US)

( * ) Notice: Subject to any disclaimer, the term of this patent is extended or adjusted under 35 U.S.C. 154(b) by 310 days.

(21) Appl. No.: 12/953,035

(22) Filed: Nov. 23, 2010

(65) Prior Publication Data

US 2012/0127658 A1 May 24, 2012

(51) Int. Cl.
*G06F 1/16* (2006.01)
*H05K 5/00* (2006.01)
*H05K 7/00* (2006.01)

(52) U.S. Cl. .............. 361/679.31; 361/679.58; 361/726; 361/727

(58) Field of Classification Search ............. 361/679.02, 361/679.31–679.45, 679.58, 724–727
See application file for complete search history.

(56) References Cited

U.S. PATENT DOCUMENTS

| | | | | |
|---|---|---|---|---|
| 3,453,586 A * | 7/1969 | Brendlen, Jr | ................. | 439/153 |
| 5,110,301 A * | 5/1992 | Inoue et al. | .................... | 439/310 |
| 5,205,752 A * | 4/1993 | Taguchi et al. | ................ | 439/157 |
| 5,325,263 A * | 6/1994 | Singer et al. | ............. | 361/679.39 |
| 5,518,412 A * | 5/1996 | Larabell | ........................ | 439/157 |
| 5,721,669 A * | 2/1998 | Becker et al. | ............ | 361/679.31 |
| 5,790,373 A * | 8/1998 | Kim et al. | ................ | 361/679.31 |
| 6,005,208 A * | 12/1999 | Castonguay | .................. | 200/308 |
| 6,008,984 A * | 12/1999 | Cunningham et al. | ... | 361/679.31 |
| 6,045,377 A * | 4/2000 | Kajiura | .......................... | 439/159 |
| 6,137,684 A * | 10/2000 | Ayd et al. | ....................... | 361/727 |
| 6,186,804 B1 * | 2/2001 | Smith et al. | .................... | 439/157 |
| 6,363,450 B1 | 3/2002 | Lash et al. | | |
| 6,396,703 B1 | 5/2002 | White | | |
| 6,549,424 B1 * | 4/2003 | Beseth et al. | .................. | 361/801 |
| 6,731,515 B2 | 5/2004 | Rhoads | | |
| 6,891,728 B1 * | 5/2005 | Mease et al. | .................. | 361/724 |
| 6,912,124 B2 * | 6/2005 | Megason et al. | ......... | 361/679.02 |
| 7,283,371 B1 * | 10/2007 | Grouell et al. | ................ | 361/741 |
| 7,295,447 B2 * | 11/2007 | Strmiska et al. | .............. | 361/798 |

(Continued)

OTHER PUBLICATIONS

Yao-Ming Liu, Chun-Hung Lee and Shih-Tsung Chen; "Fastening Assembly for Memory Riser Card;" Filed Jul. 10, 2006; U.S. Appl. No. 11/482,788; 17 Pages.

(Continued)

*Primary Examiner* — Adrian S Wilson
(74) *Attorney, Agent, or Firm* — Haynes and Boone, LLP

(57) ABSTRACT

A memory carrier system includes a carrier chassis that includes a board having a board connector. The board is operable to couple to a plurality of memory modules. A pair of pinion cams are rotatably mounted to the carrier chassis. A handle is moveably coupled to the carrier chassis and includes a pair of rack arms. Each rack arm engages a respective pinion cam. The carrier chassis is operable to be positioned in an information handling system (IHS) chassis that includes an IHS connector, and the handle is operable to be moved relative to the carrier chassis in order to rotate the pinion cams into an engagement with the IHS chassis that provides a cam force that mates the board connector to the IHS connector.

20 Claims, 16 Drawing Sheets

U.S. PATENT DOCUMENTS

| | | | | |
|---|---|---|---|---|
| 7,297,015 B1* | 11/2007 | Desrosiers et al. | ............ | 439/377 |
| 7,580,260 B2* | 8/2009 | Figuerado | ...................... | 361/695 |
| 7,684,179 B1* | 3/2010 | Lima | ........................ | 361/679.33 |
| 7,791,865 B2* | 9/2010 | Wirtzberger et al. | .... | 361/679.01 |
| 8,279,596 B2* | 10/2012 | Rodriguez et al. | ........ | 361/679.48 |
| 2002/0104396 A1* | 8/2002 | Megason et al. | ................. | 74/109 |
| 2003/0117779 A1* | 6/2003 | Gough et al. | .................. | 361/728 |
| 2004/0100762 A1* | 5/2004 | Yuan et al. | ..................... | 361/685 |
| 2005/0174743 A1* | 8/2005 | Downing et al. | .............. | 361/725 |
| 2006/0171110 A1* | 8/2006 | Li | ................................. | 361/685 |
| 2007/0091559 A1* | 4/2007 | Malone | ......................... | 361/685 |
| 2007/0206351 A1* | 9/2007 | Szelong et al. | ............... | 361/685 |

OTHER PUBLICATIONS

Alejandro Z. Rodriguez, Brian T. Whitman, Char Damneun, Corey D. Hartman, Glen P. Gordon and Jeffory L. Smalley; "Fan Mounting System;" Filed Jul. 29, 2010; U.S. Appl. No. 12/846,286; 33 pages.

Corey D. Hartman, Brian T. Whitman, Peter Heinrich, Russell Smith, Scott Munroe Deane and Timothy Spencer; "Memory Retention System to Reduce Shock-Related Discontinuities;" Filed Oct. 21, 2010; U.S. Appl. No. 12/908,995; 24 Pages.

* cited by examiner

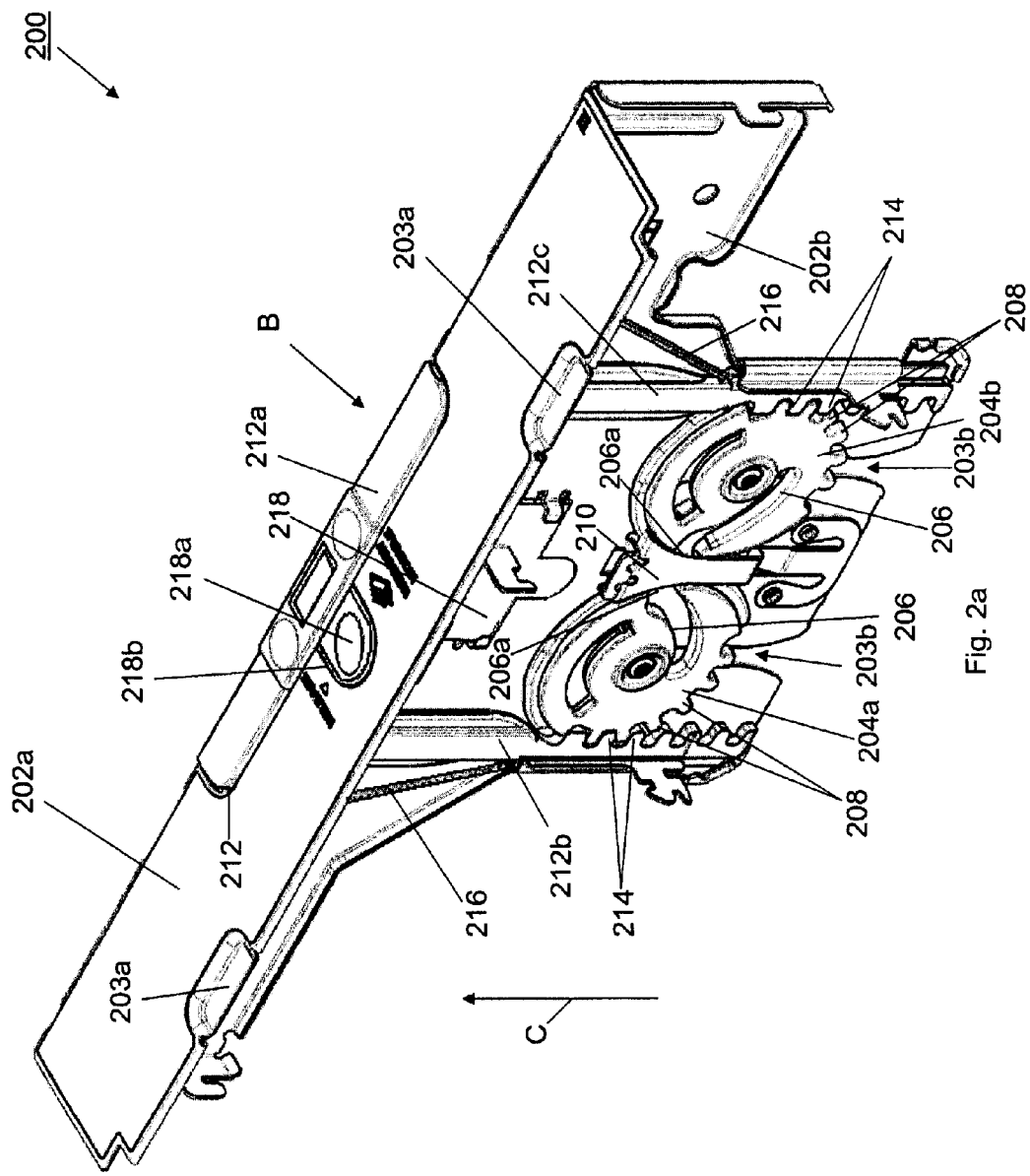

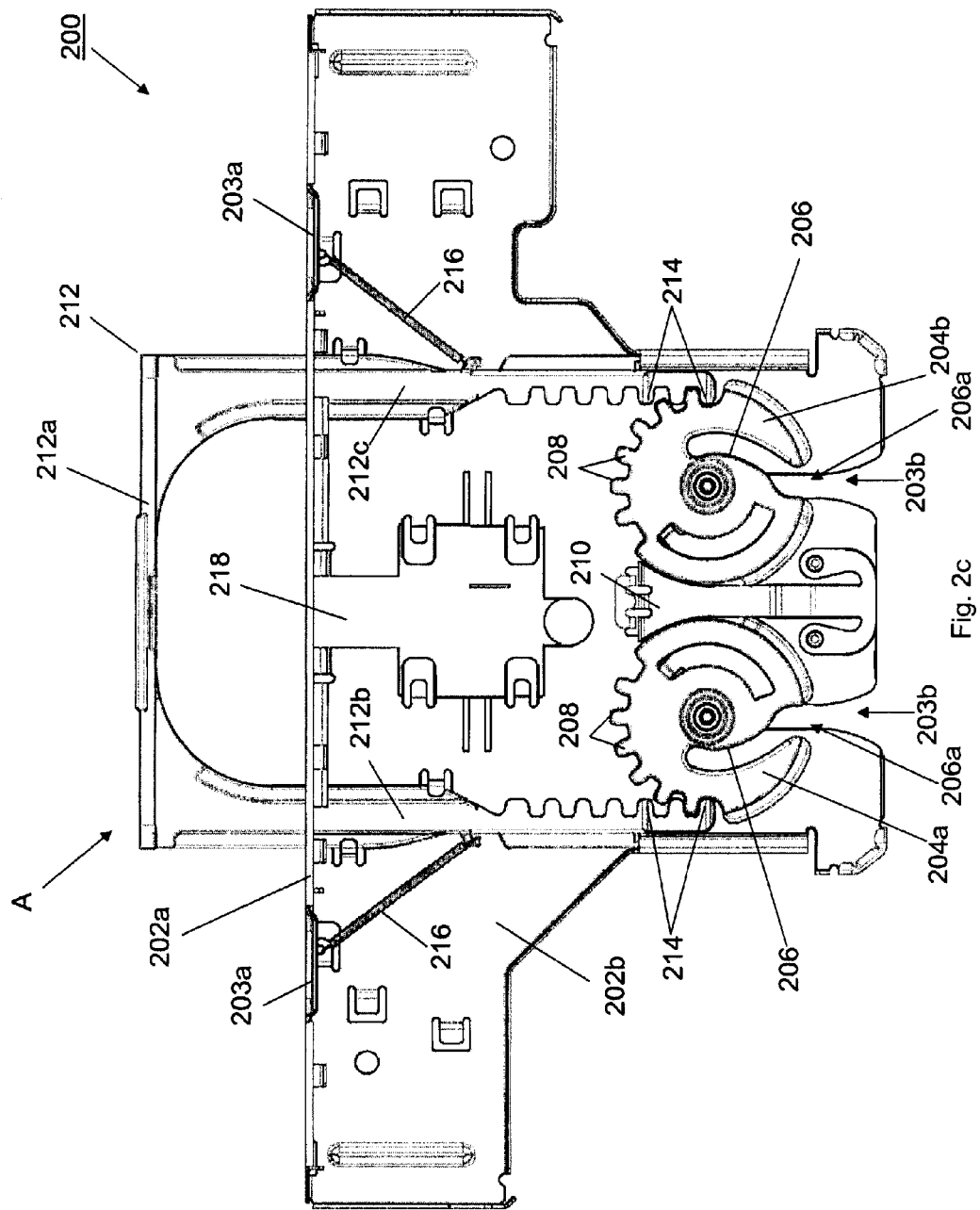

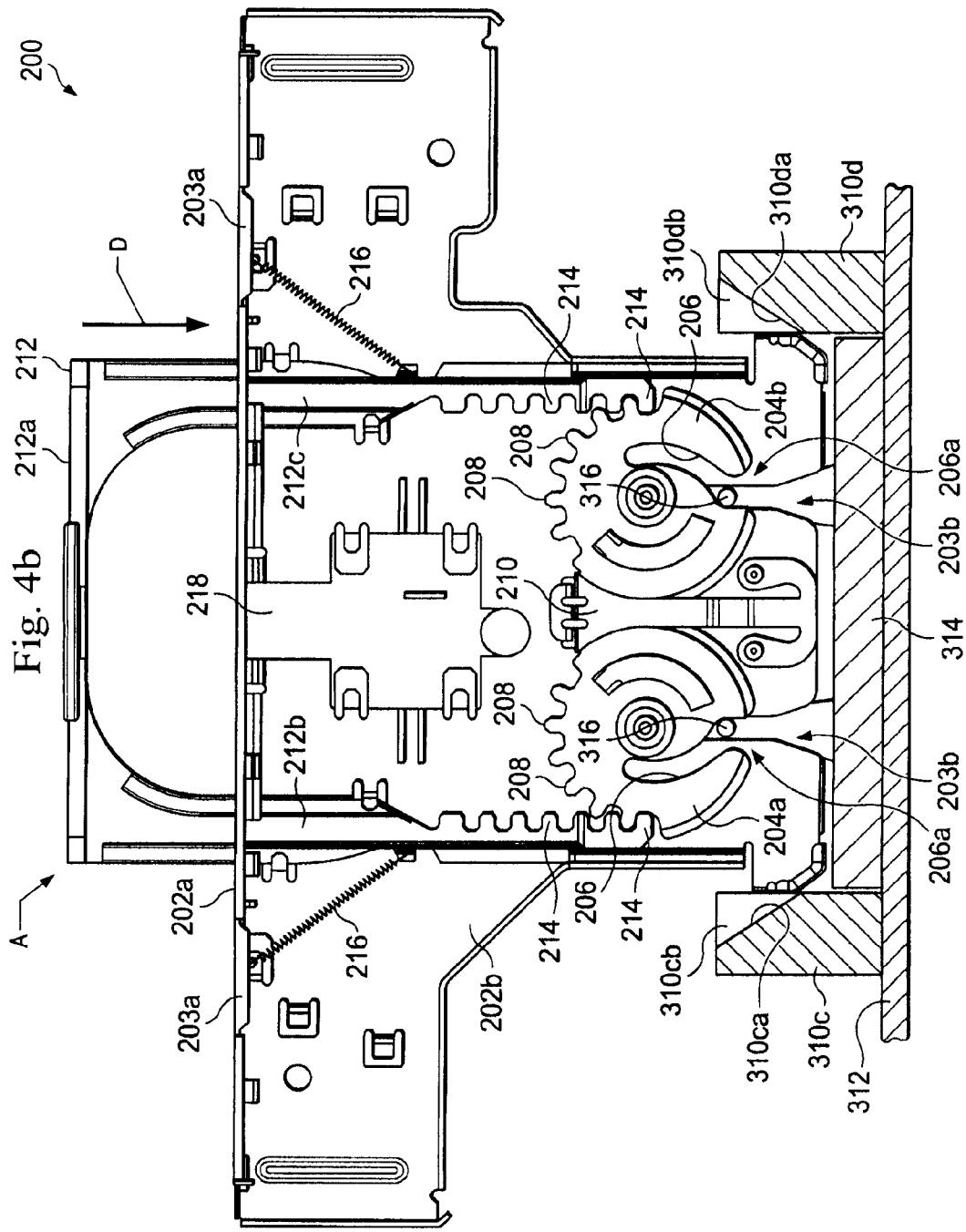

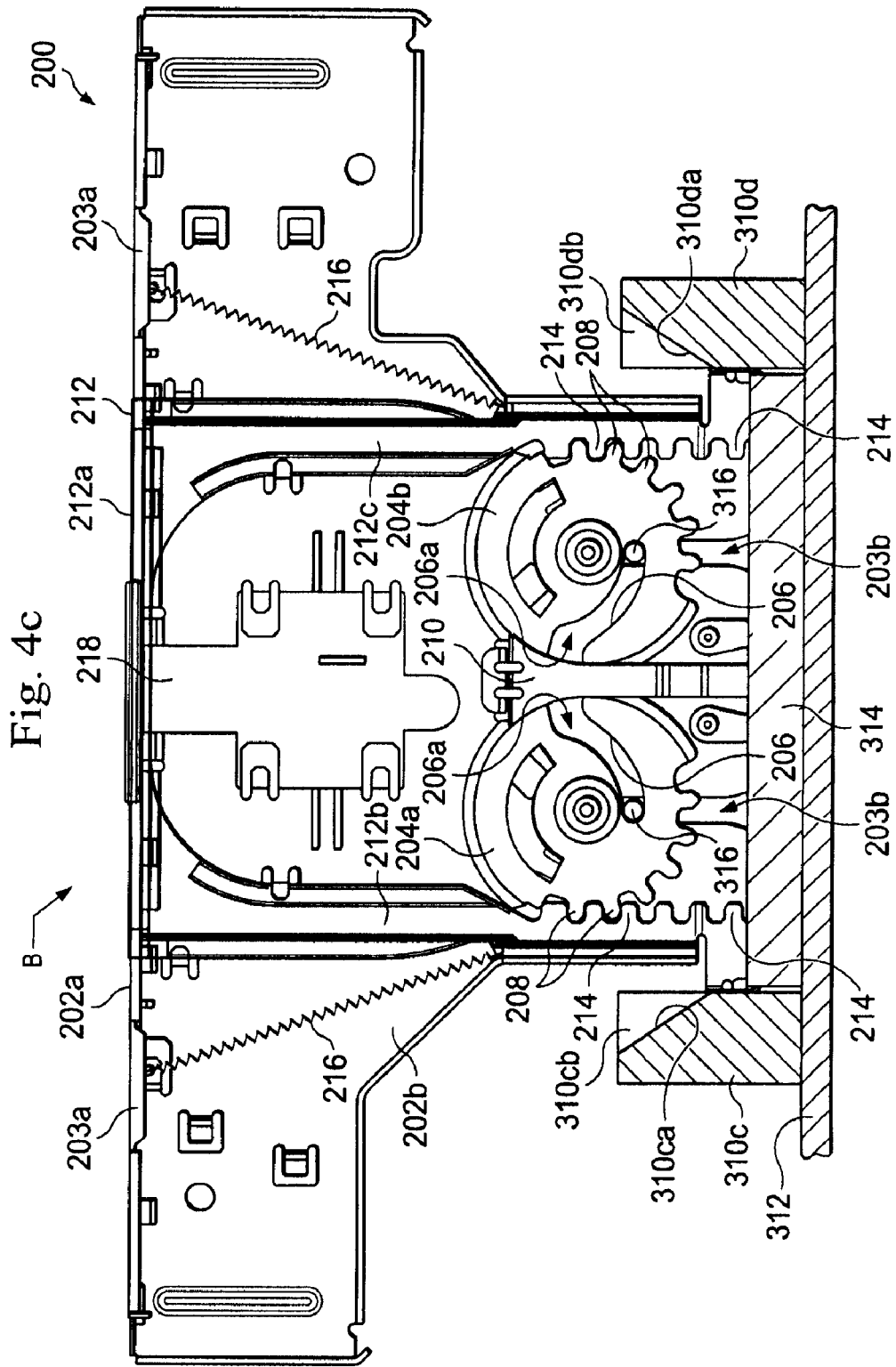

MEMORY CARRIER AND IHS COUPLING SYSTEM

BACKGROUND

The present disclosure relates generally to information handling systems (IHSs), and more particularly to a memory carrier and IHS coupling system to couple memory modules to an IHS.

As the value and use of information continues to increase, individuals and businesses seek additional ways to process and store information. One option is an IHS. An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs include an IHS chassis that houses a plurality of components. As the desire to minimize the volume occupied by the IHS chassis increases while the system requirements of the IHS increase, the volume available to house components in the IHS chassis decreases. For example, conventional systems have problems with fitting a relatively large number of memory modules in the IHS chassis and providing the high insertion forces necessary to mate the memory modules to connectors in the IHS chassis while also optimizing the volume used to couple and mate the memory modules with the IHS.

Accordingly, it would be desirable to provide an improved memory carrier and IHS coupling system.

SUMMARY

According to one embodiment, a memory carrier system includes a carrier chassis that includes a board having a board connector, wherein the board is operable to couple to a plurality of memory modules; a pair of pinion cams that are rotatably mounted to the carrier chassis; and a handle that is moveably coupled to the carrier chassis and includes a pair of rack arms, wherein each rack arm engages a respective pinion cam; wherein the carrier chassis is operable to be positioned in an information handling system (IHS) chassis that includes an IHS connector, and the handle is operable to be moved relative to the carrier chassis in order to rotate the pinion cams into an engagement with the IHS chassis that provides a cam force that mates the board connector to the IHS connector.

BRIEF DESCRIPTION OF THE DRAWINGS

FIG. 2a is a perspective view illustrating an embodiment of a carrier chassis in a cammed orientation.

FIG. 2c is a front view illustrating an embodiment of the carrier chassis of FIG. 2a in an uncammed orientation.

FIG. 3b is a perspective view illustrating an embodiment of a plurality of components housed in the IHS chassis of FIG. 3a.

FIG. 3c is a perspective view illustrating an embodiment of a bridge member that housed in the IHS chassis of FIG. 3a.

FIG. 4b is a partial cross-sectional view illustrating an embodiment of the carrier chassis of FIGS. 2a, 2b, 2c, 2d, and 2e being coupled to an IHS connector in the IHS chassis of FIGS. 3a, 3b, 3c, 3d, and 3e.

FIG. 4c is a partial cross-sectional view illustrating an embodiment of the carrier chassis of FIGS. 2a, 2b, 2c, 2d, and 2e coupled to an IHS connector in the IHS chassis of FIGS. 3a, 3b, 3c, 3d, and 3e.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
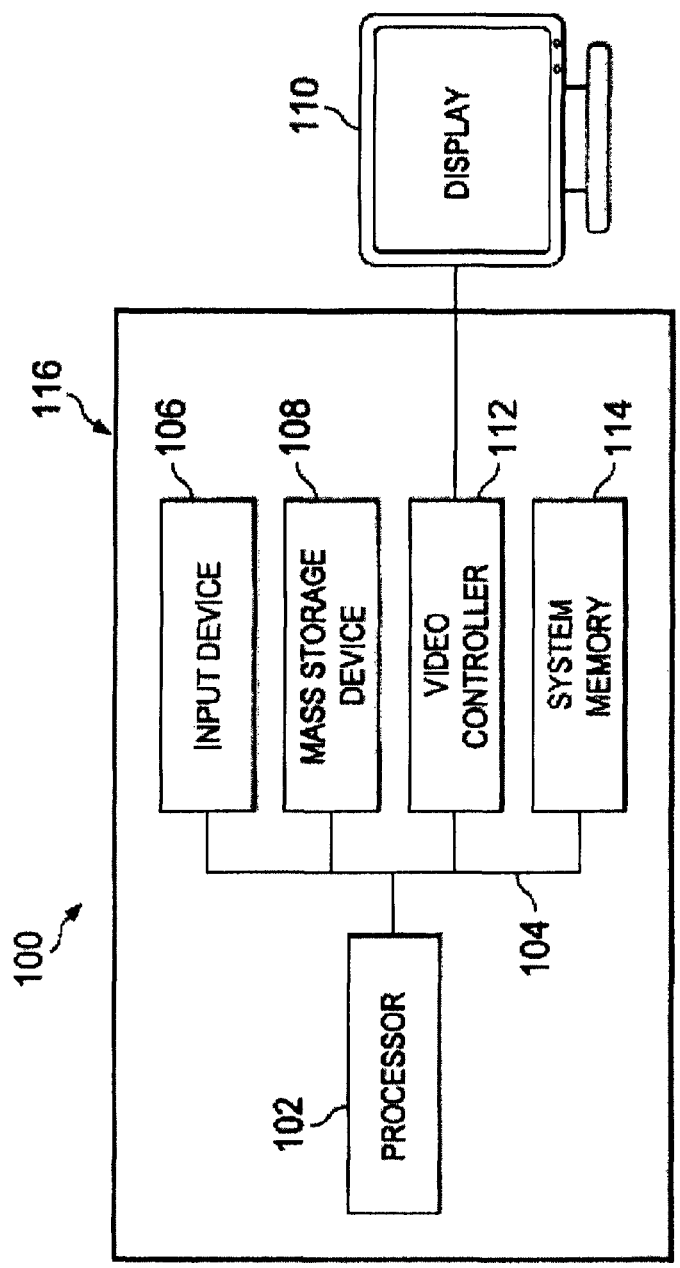
FIG. 1 is a schematic view illustrating an embodiment of an information handling system (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Referring now to FIGS. 2a, 2b, 2c, 2d, and 2e+, a carrier chassis 200 is illustrated. In an embodiment, the carrier chassis 200 may be the IHS chassis 116 described above with reference to FIG. 1 and may include some or all of the components of the IHS 100. In the embodiment discussed below, the carrier chassis 200 is a high density memory riser for coupling a plurality of memory modules to an IHS. However, one of skill in the art will recognize that the disclosure is not so limited, and the carrier chassis 200 may be used in a variety of other implementations. The carrier chassis 200 includes a pair of chassis walls 202a and 202b that are oriented substantially perpendicularly to each other. In an embodiment, the carrier walls 202a and 202b are fabricated from sheet metal (e.g., steel) and form a rigid outer surface of the carrier chassis 200 that allows a camming mechanism, discussed below, that is capable of providing high insertion forces, protects components that are coupled to the carrier chassis 200, and provides a flat surface to support the carrier chassis 200 when components are added and/or removed from the carrier chassis 200. In an embodiment, the carrier wall 202a may include notches or other features to allow for visual alignment of the carrier chassis 200 and an IHS chassis, discussed in further detail below.

A pair of door release channels 203a are defined by the carrier wall 202a and located in a spaced apart orientation from each other. A pair of camming post channels 203b are defined by the carrier wall 202b and extend into the carrier wall 202b from an edge of the carrier wall 202b that is opposite the carrier wall 202a. In an embodiment, the camming post channels 203a are located in a spaced apart orientation from each other such that the camming post channels 203b are substantially parallel to each other. A pair of pinion cams 204a and 204b are each rotatably coupled to the carrier wall 202b adjacent a respective camming post channel 203b. Each of the pinion cams 204 and 204b defines an arcuate cam channel 206 that extends into each pinion cam 204a and 204b from a respective cam channel entrance 206a defined by each pinion cam 204a and 204b. A plurality of cam teeth 208 extend radially from the edge of each pinion cam 204a and 204b. A cam lockout mechanism 210 is mounted to the carrier wall 202b between the pinion cams 204a and 204b and includes features that are operable to engage and disengage the pinion cams 204a and 204b to prevent and allow, respectively, rotation of the pinion cams 204a and 204b relative to the carrier wall 202b, as will be described in further detail below. A handle 212 is moveably coupled to the carrier wall 202b and includes a top wall 212a and a plurality of rack arms 212b and 212c that extend in a substantially perpendicular orientation from the top wall 212a in a spaced apart orientation from each other such that the rack arms 212b and 212c are substantially parallel to each other. A plurality of rack teeth 214 extend from each rack arm 212b and 212c and into engagement with the cam teeth 208 on the pinion cams 204a and 204b. A spring 216 extends between the carrier wall 202a and the each rack arm 212b and 212c. A handle retaining member 218 is coupled to the chassis 202b and engages the handle 212. A release button 218a of the handle retaining member 218 is located in an opening 218b defined by the carrier wall 202a such that it is flush with the carrier wall 202a. The release button 218a is operable to be actuated to disengage the handle retaining member 218 and the handle 212, as described in further detail below.

Figure 2B:
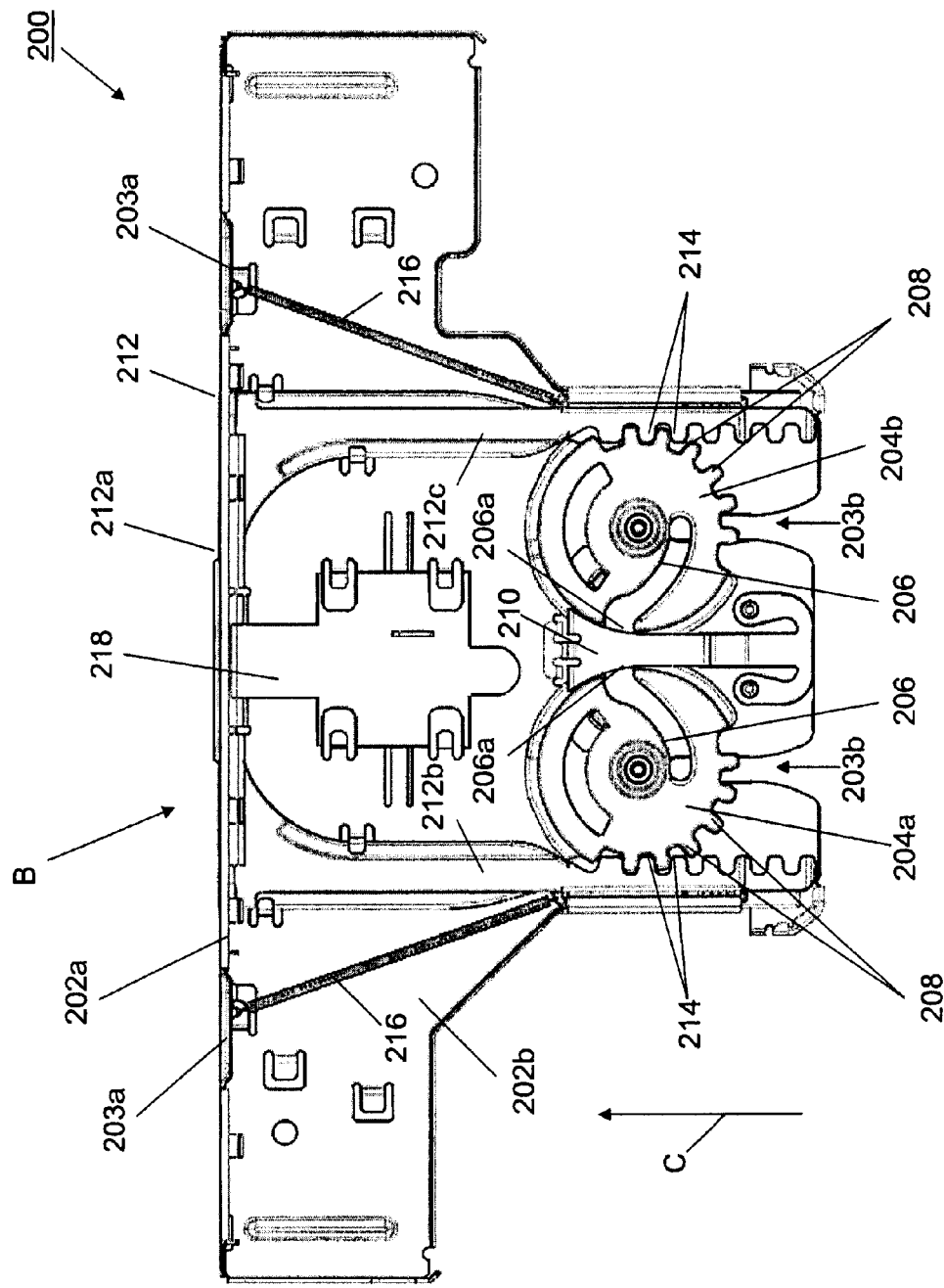
FIG. 2b is a front view illustrating an embodiment of the carrier chassis of FIG. 2a in the cammed orientation.
Figure 2D:
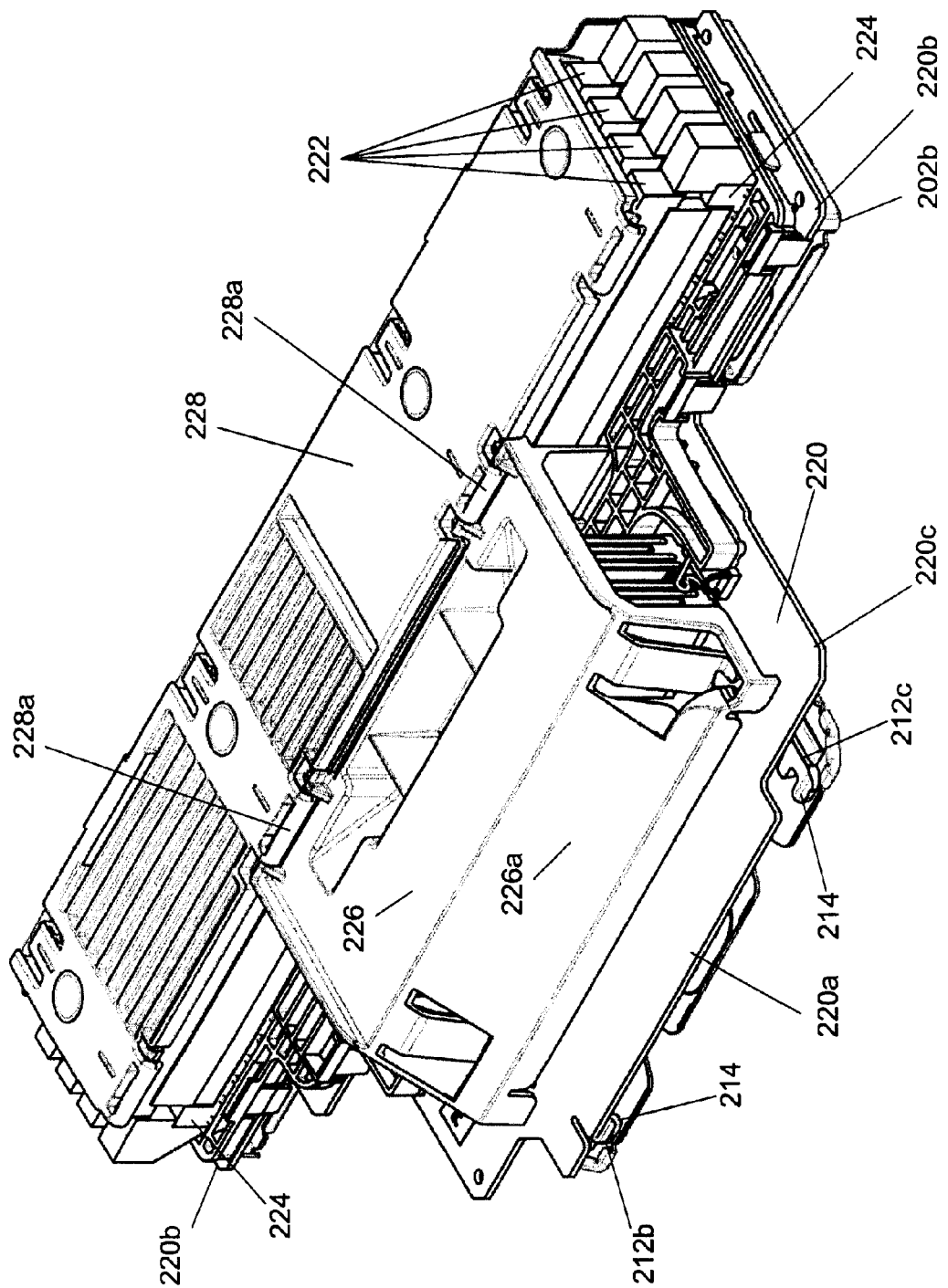
FIG. 2d is a perspective view illustrating an embodiment of the carrier chassis of FIGS. 2a, 2b, and 2c with a plurality of components coupled to the carrier chassis.
Figure 2E:
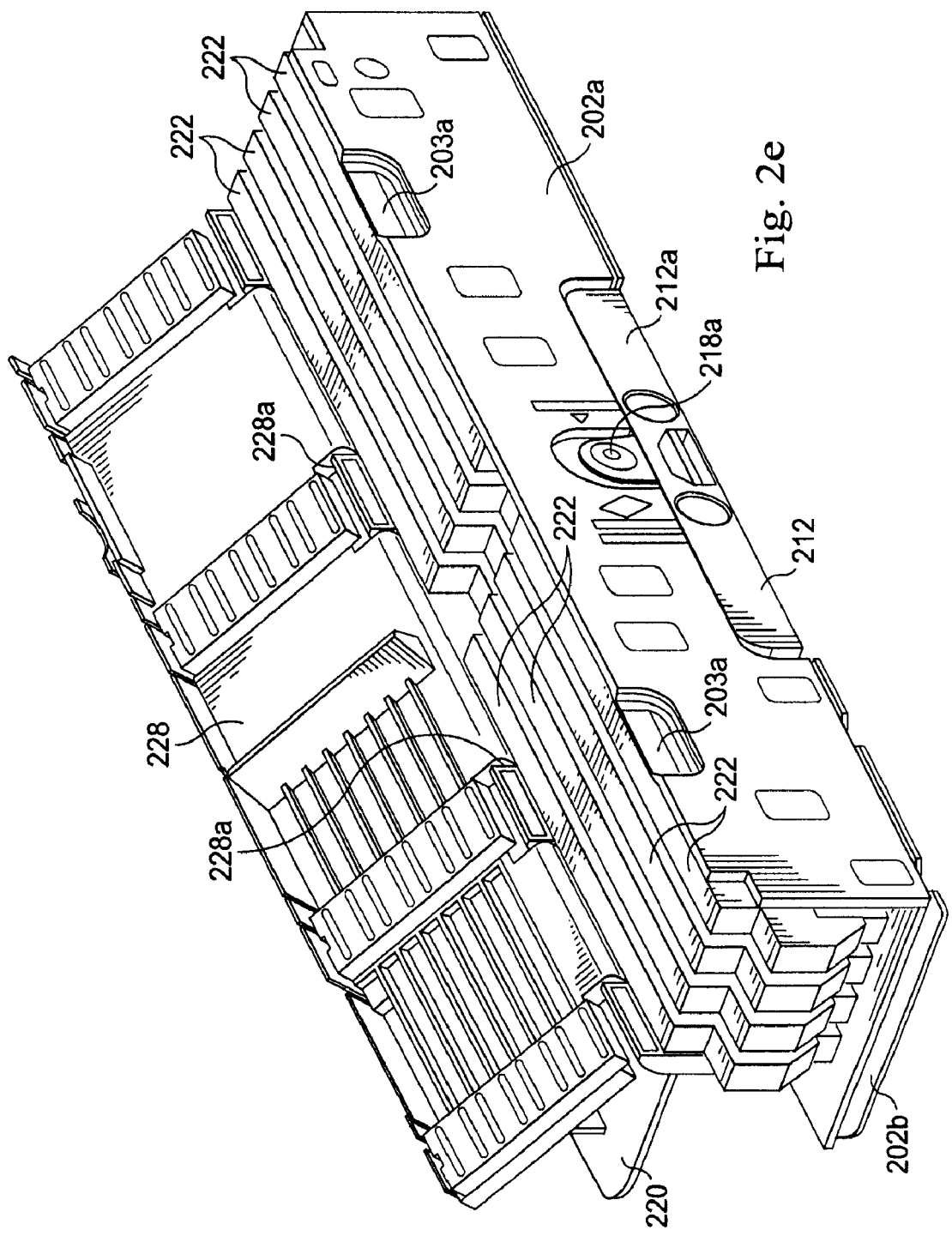
FIG. 2e is a perspective view illustrating an embodiment of the carrier chassis of FIG. 2d with a door coupled to the carrier chassis and in an open position.

An embodiment of the carrier chassis 200 is described and/or illustrated in co-pending U.S. patent application Ser. No. 12/846,286, filed on Jul. 29, 2010, and U.S. patent application Ser. No. 12/908,995, filed on Oct. 21, 2010, the disclosures of which are incorporated herein by reference. In an embodiment, a board 220 is mounted to the carrier wall 202a and includes a board connector 220a, a pair of primary guide edges 220b, and a secondary guide edge 220c. A plurality of memory modules 222 may be coupled to the board 220 through a plurality of memory connectors 224 that are mounted on the board 220. In an embodiment, the board 220 may include processors and/or other components that are coupled to the memory connectors 224. A shroud 226 is mounted to the board 220 to protect components on the board 220 and to direct airflow to components on the board 220, and the shroud 226 includes a directing surface 226a that is oriented at approximately a 45 degree angle to the board 220. In an embodiment, the shroud 226 may engage the board 220 and/or the carrier wall 202b and be coupled to and decoupled from the board 220a and/or the carrier wall 202b without the use of a tool. A door member 228 is rotatably coupled to the shroud 226 through a pair of hinges 228a, as illustrated in FIG. 2d, and may include features (not illustrated) that engage the carrier wall 202a to resist rotation of the door member 228 relative to the shroud 226. In an embodiment, the door member 228 may be accessed through the door release channels 203a to disengage the door member 2228 and the carrier wall 202a in order to rotate the door member 228 relative to the shroud 226, as illustrated in FIG. 2e.

In operation, the handle 212 and pinion cams 204a and 204b are moveable between two orientations: a cammed orientation A and an uncammed orientation B. With the handle retaining member 218 engaging the handle 212, the handle 212 and pinion cams 204a and 204b are in the cammed orientation B with the top wall 212a of the handle 212 positioned flush with the carrier wall 202a, as illustrated in FIGS. 2a and 2b. In the cammed orientation B, the cam entrance 206a on each cam channel 206 defined by the pinion cams 204a and 204b is spaced apart from its respective camming post channel 203b, and the springs 216 are extended and bias the handle 212 in a direction C. The actuation of the release button 218a will disengage the handle retaining member 218 and the handle 212 and allow the springs 216 to move the handle 212 relative to the carrier wall 202b in the direction C. Movement of the handle 212 in the direction C causes the pinion cams 204a and 204b to rotate relative to the carrier wall 202b, due to the engagement between the rack teeth 214 and the cam teeth 208, until the cam entrance 206a on each cam channel 206 defined by the pinion cams 204a and 204b is located immediately adjacent its respective camming post channel 203b and the handle 212 and pinion cams 204a and 204b are in the uncammed orientation A, as illustrated in FIG. 2c. In an embodiment, as described in further detail below, the handle 212 and pinion cams 204a and 204b must be in the uncammed orientation A for the carrier chassis 200 to be removed from an IHS chassis, and once the carrier chassis 200 is removed from the IHS chassis the cam lockout mechanism 210 will engage the pinion cams 204a and 204b to resist rotation of the pinion cams 204a and 204b relative to the carrier wall 202b. With the pinion cams 204a and 204b resisted from rotating relative to the carrier wall 202b, the cam entrance 206a on each cam channel 206 defined by the pinion cams 204a and 204b will remain located immediately adjacent its respective camming post channel 203b and the handle 212 will remain extended from the carrier wall 202a until the carrier chassis 200 is positioned in an IHS chassis.

Figure 3A:
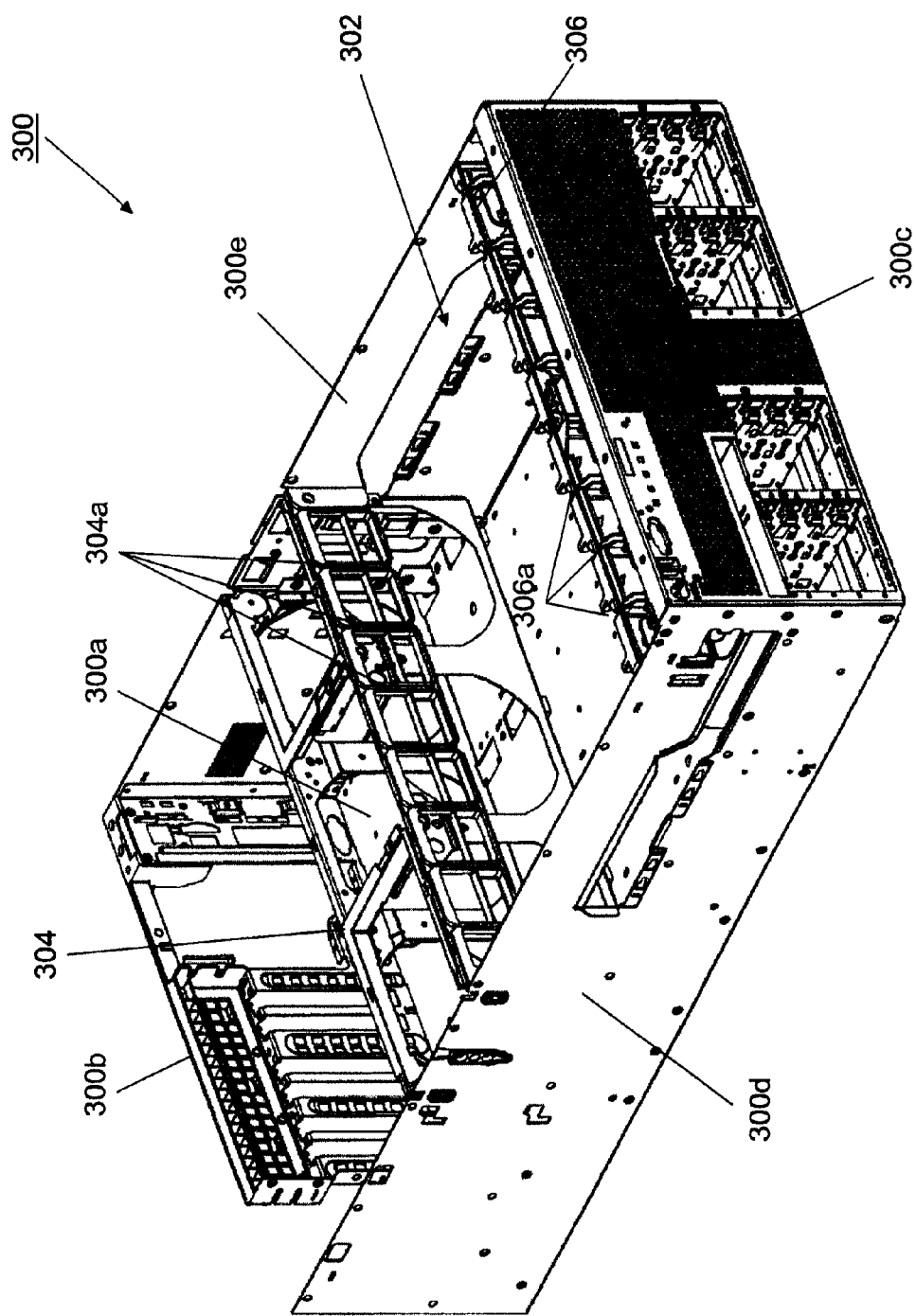
FIG. 3a is a perspective view illustrating an embodiment of an IHS chassis used with the carrier chassis of FIGS. 2a, 2b, 2c, 2d, and 2e.
Figure 3B:
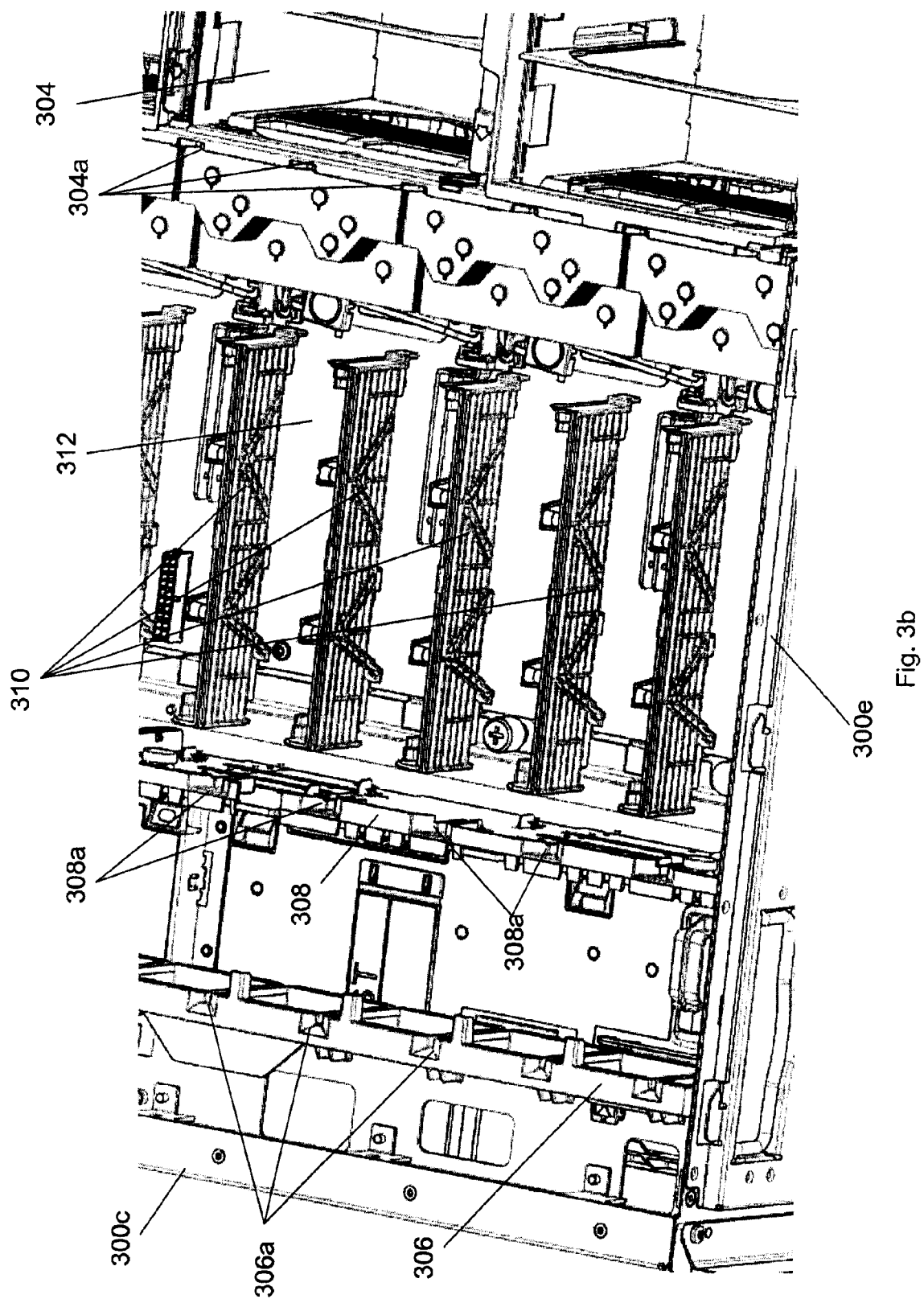
Figure 3C:
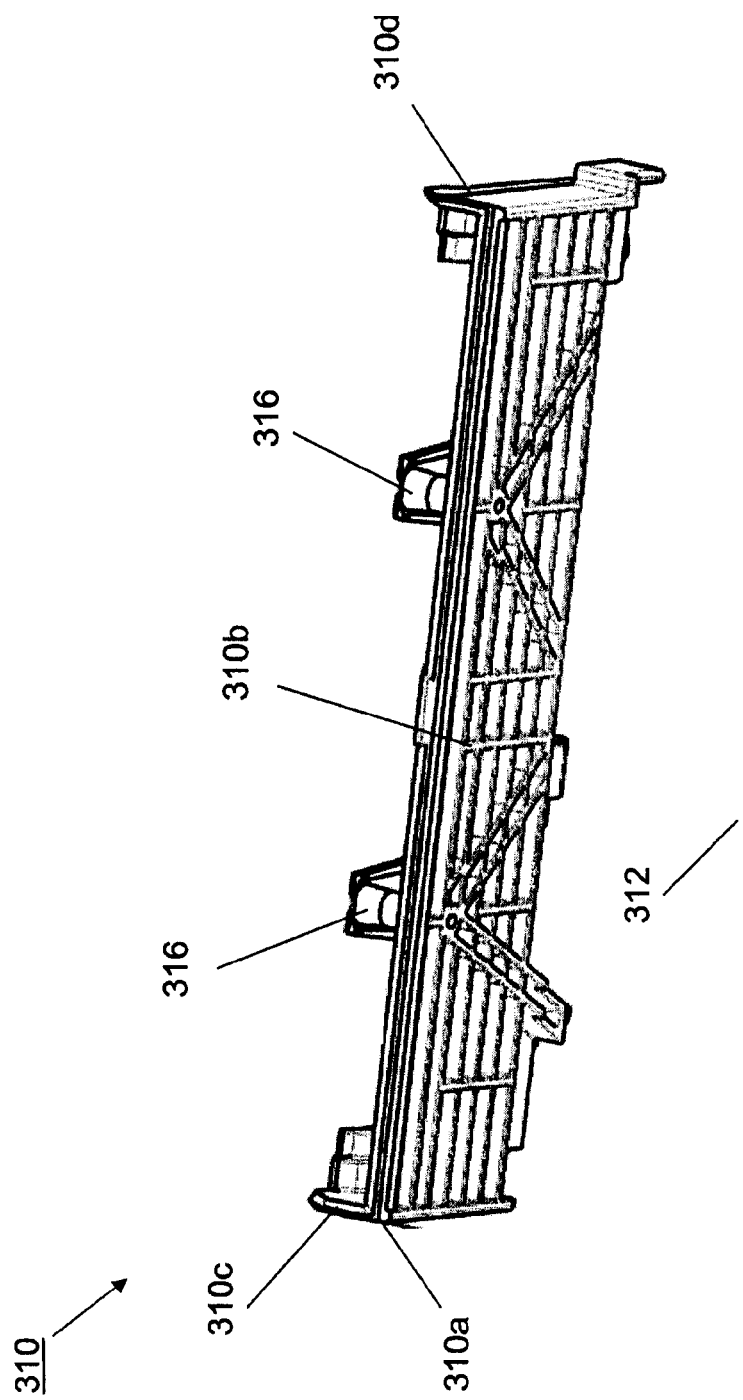
Figure 3D:
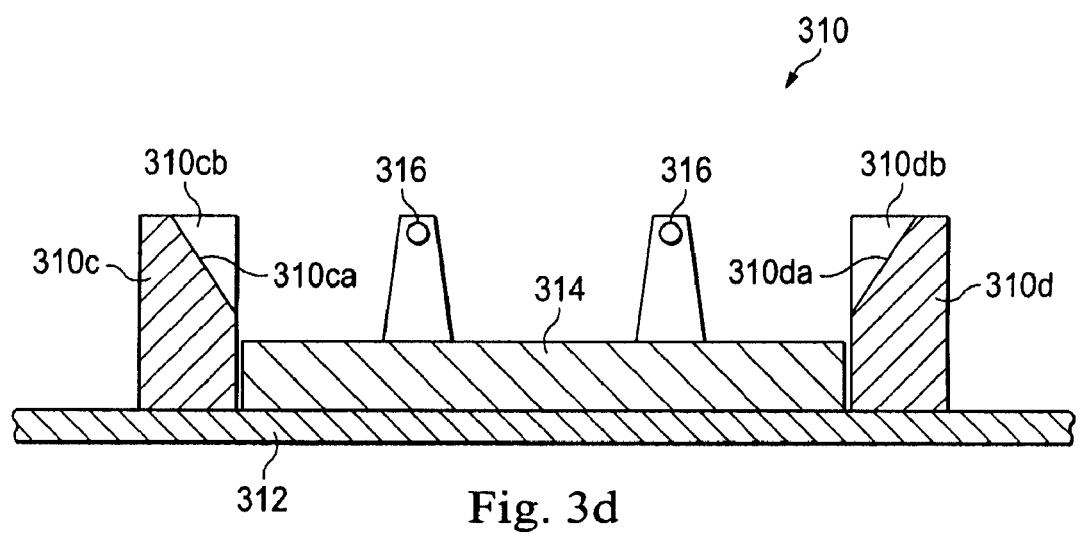
FIG. 3d is a cross-sectional view illustrating an embodiment of the bridge member of FIG. 3c.
Figure 3E:
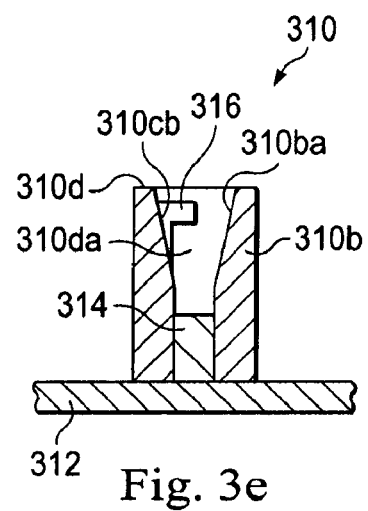
FIG. 3e is a cross-sectional view illustrating an embodiment of the bridge member of FIG. 3c.

Referring now to FIGS. 3a and 3b, an IHS chassis 300 is illustrated. In an embodiment, the IHS chassis 300 may be the IHS chassis 116 described above with reference to FIG. 1 and may include some or all of the components of the IHS 100. An embodiment of the IHS chassis 300 is described and/or illustrated in co-pending U.S. patent application Ser. No. 12/846,286, filed on Jul. 29, 2010, and U.S. patent application Ser. No. 12/908,995, filed on Oct. 21, 2010, the disclosures of which are incorporated herein by reference. The IHS chassis 300 includes a base wall 300a, a front wall 300b that extends substantially perpendicularly from an edge of the base wall 300a, a rear wall 300c that extends substantially perpendicularly from an edge of the base wall 300a and opposite the base wall 300a from the front wall 300b, and a pair of opposing side walls 300d and 300e that extend substantially perpendicularly from opposing edges of the base wall 300a and between the base wall 300a, the front wall 300b, and the rear wall 300c. An IHS housing 302 is defined by the IHS chassis 300 between the base wall 300a, the front wall 300b, the rear wall 300c, and the side walls 300d and 300e. A fan bay 304 is located in the IHS housing 302 and coupled to the side walls 300d and 300e. A plurality of primary guide channels 304a are defined on the fan bay 304 in a spaced apart orientation from each other. A primary guide channel member 306 is coupled to the rear wall 300c and defines a plurality of primary guide channels 306a that are spaced apart from each other and the primary guide channels 304a defined by the fan bay 304. A secondary guide channel member 308 (illustrated in FIG. 3b, but not illustrated in FIG. 3a for clarity) extends between the side walls 300d and 300e and defines a plurality of secondary guide channels 308a that are spaced apart from each other. A plurality of bridge members 310 are mounted to a board 312 that is located in the IHS housing 302.

Referring now to FIGS. 3b, 3c, 3d, and 3e, the bridge members 310 are illustrated and described in more detail. Each bridge member 310 includes a base 310a that is mounted to the board 312 adjacent an IHS connector 314. In an embodiment, the IHS connector 314 may be coupled through the board 312 to a processor such as, for example, the processor 102 described above with reference to FIG. 1. The base 310a includes a wall 310b that extends between a pair of ends 310c and 310d and includes a guide surface 310ba that is oriented at approximately a 60 degree angle relative to the board 312. Each end 310c and 310d includes a first guide surface 310ca and 310da that is oriented at approximately a 60 degree angle relative to the board 312 and a second guide surface 310cb and 310db that is oriented at approximately a 60 degree angle relative to the board 312. A pair of camming posts extend from the base 310 in a spaced apart orientation from each other and the wall 310b.

Referring now to FIGS. 2a, 2b, 2c, 2d, 3b, 4a and 4b, a method 400 for coupling a memory carrier to an IHS is illustrated. The method 400 begins at block 402 where an IHS chassis including an IHS connector is provided. In an embodiment, the IHS chassis 300, described above with reference to FIGS. 3a, 3b, 3c, 3d, and 3e, that includes the plurality of IHS connectors 314 is provided. The method 400 then proceeds to block 404 where a carrier chassis having a board connector is positioned in the IHS chassis. In an embodiment, the carrier chassis 200, described above with reference to FIGS. 2a, 2b, 2c, 2d, and 2e, is provided in the uncammed orientation A, illustrated in FIG. 2c. A user may use the top wall 212a of the handle 212 to lift and move the carrier chassis 200 such that the board connector 220a on the board 220 is positioned adjacent the IHS housing 302 with the primary guide edges 220b on the board 220 aligned with the primary guide channels 304a and 306a defined by the fan bay 304 and the primary guide channel member 306, respectively. The carrier chassis 200 may then be lowered into the IHS housing 302 such that the primary guide edges 220b enter the primary guide channels 304a and 306a. As the user continues to move the carrier chassis 200 into the IHS housing 302, the secondary guide edge 220c on the board 220 will enter the secondary guide channel 308a defined by the secondary guide channel member 308. Further movement of the carrier chassis 200 into the IHS housing 302 results in the board connector 220a engaging the first and second guide surfaces 310ca, 310da, 310cb, and 310db on the bridge member 310 in order to gather the board connector 220a within the gather tolerance of the IHS connector 314 such that the board connector 220a is aligned with the IHS connector 314.

While the board connector 220a is aligning with the IHS connector 314, the camming posts 316 on the bridge member 310 enter the camming post channels 203b and move through the camming post channels 203b until they enter the cam channels 206 through the cam channel entrances 206a, as illustrated in FIG. 4b. As described above, when the carrier chassis 200 is in the uncammed orientation A, the cam lockout mechanism 210 prevents rotation of the pinion cams 204a and 204b relative to the carrier wall 202b. However, in an embodiment, while the board connector 220a is aligning with the IHS connector 314, the bridge member 310 engages the cam lockout mechanism 210 to disengage the cam lockout mechanism 210 and the pinion cams 204a and 204b such that the pinion cams 204a and 204b are allowed to rotate relative to the carrier wall 202b.

Figure 4A:
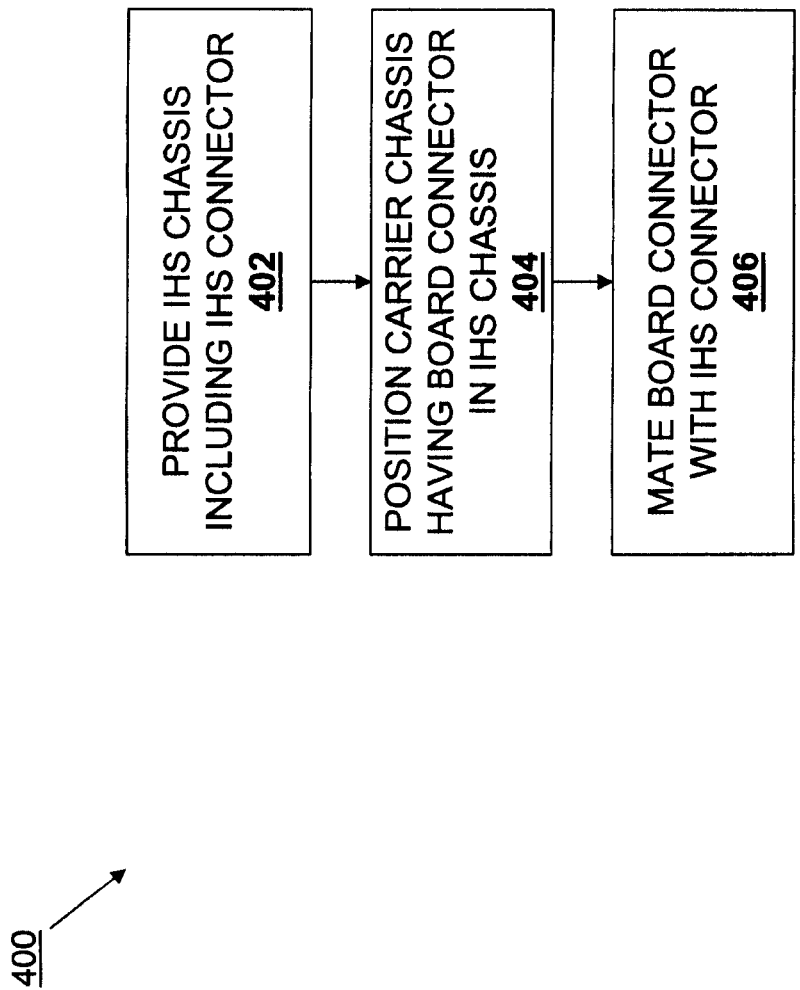
FIG. 4a is a flow chart illustrating an embodiment of a method for coupling a carrier chassis to an IHS chassis.
Figure 4D:
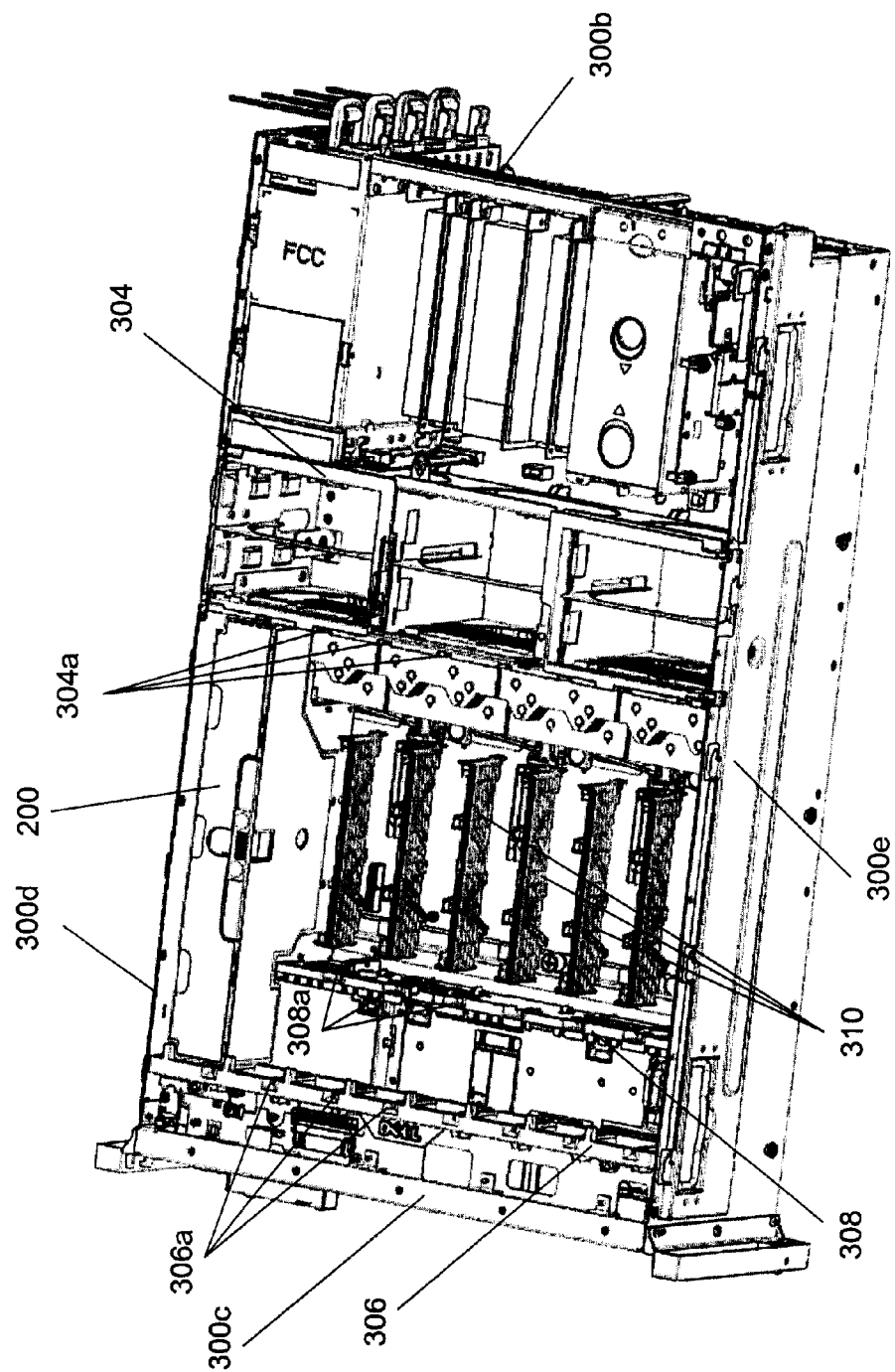
FIG. 4d is a perspective view illustrating an embodiment of the carrier chassis of FIGS. 2a, 2b, 2c, 2d, and 2e coupled to an IHS connector in the IHS chassis of FIGS. 3a, 3b, 3c, 3d, and 3e.

Referring now to FIGS. 4a, 4b, 4c, and 4d, the method 400 proceeds to block 406 where the board connector is mated with the IHS connector. With the carrier chassis 200 positioned in the IHS chassis 300 as illustrated in FIG. 4b, the user may move the handle 212 in a direction D by pushing on the top wall 212 towards the carrier wall 202a. Movement of the handle 212 in the direction D results in the rotation of the pinion cams 204a and 204b due to the engagement of the rack teeth 214 with the cam teeth 208. In the illustrated embodiment, the pinion cams 204a and 204b rotate in opposite directions relative to each other when the handle 212 is moved. As the pinion cams 204a and 204b rotate, the camming posts 316 engage the pinion cams 204a and 204b as they travel relative to the pinion cams 204a and 204b through the cam channels 206, and due to the geometry of the cam channels 206 the carrier chassis 200, and therefore the board connector 220a, move in the direction D. Thus, as the handle 212 is moved from the uncammed orientation A illustrated in FIG. 4b to the cammed orientation B illustrated in FIG. 4c, the system provides a cam force that mates the board connector 220a with the IHS connector 314, as illustrated in FIGS. 4c and 4d.

In an embodiment, the pinion cams 204a and 204b provide a mechanical assist to the user in order to provide the cam force to mate the board connector 220a and the IHS connector 314. In the illustrated embodiment, the mechanical assist is 4:1. However, one of skill in the art will recognize that the dimensions of the pinion cams 204a and 204b may be modified to provide different mechanical assist ratios as needed. Furthermore, modification of the pinion cams 204a and 204b to increase or decrease the mechanical assist ratio may be accomplished in substantially the same mechanical volume as is provided for the camming system in the illustrated embodiment. In an embodiment, when the camming posts 316 reach the end of the cam channels 206, the carrier chassis 212 is secured to the IHS chassis 300 and prevented from shifting, and the handle retention mechanism 218 engages the handle 212 to retain the handle 212 flush with the carrier wall 202a, as illustrated in FIG. 4c. In an embodiment, the pinion cams 204a and 204b, the handle 212, and/or other components of the system include geometry and/or materials that allows them to absorb an overmate force that is applied by the system to ensure that the board connector 220a is always mated with and engages the bottom of the IHS connector 314 for connectivity and vibration issues. Having the pinion cams 204a and 204b, the handle 212, and other components absorb the overmate force prevents damaging forces from being absorbed by the board connector 220a or the IHS connector 314.

Figure 4E:
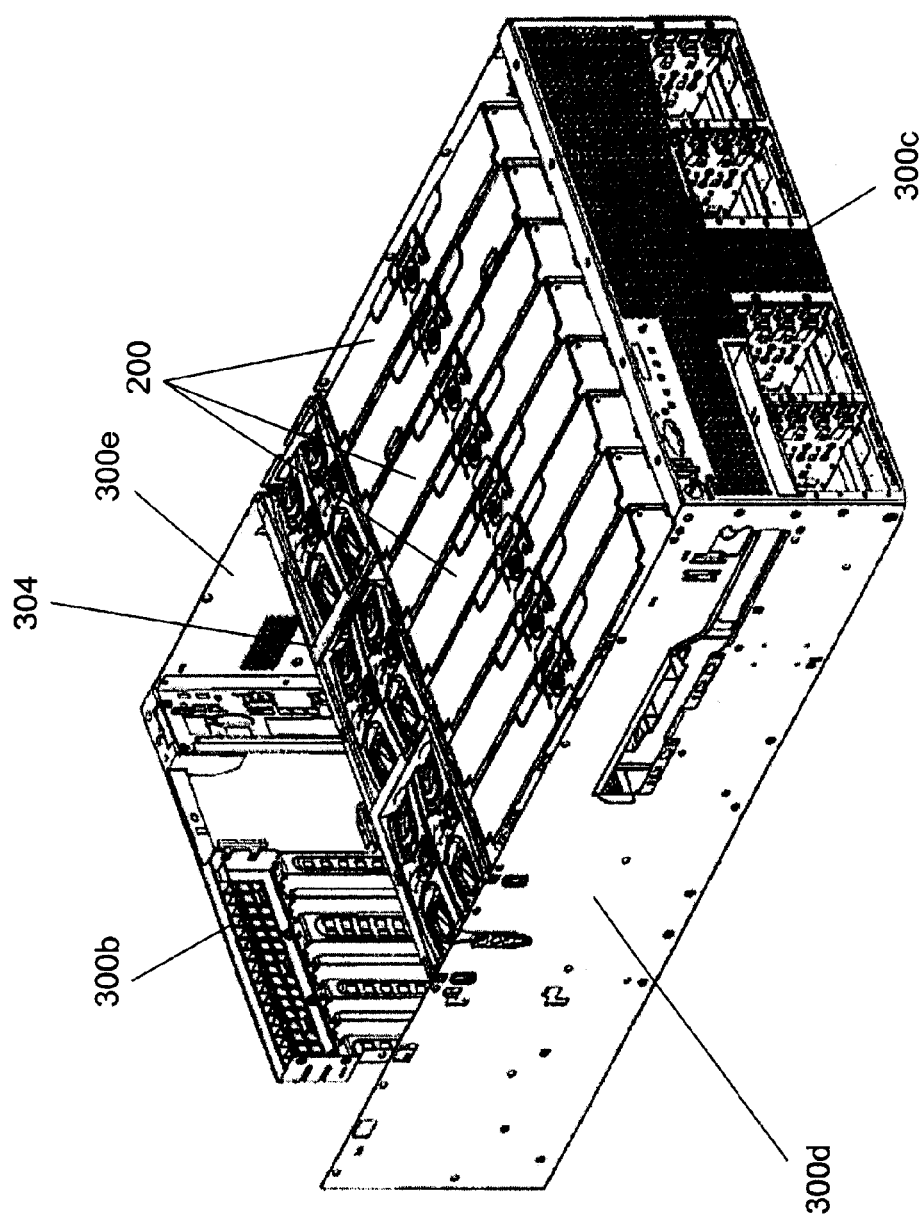
FIG. 4e is a perspective view illustrating an embodiment of a plurality of the carrier chassis of FIGS. 2a, 2b, 2c, 2d, and 2e each coupled to an IHS connector in the IHS chassis of FIGS. 3a, 3b, 3c, 3d, and 3e.
Figure 4F:
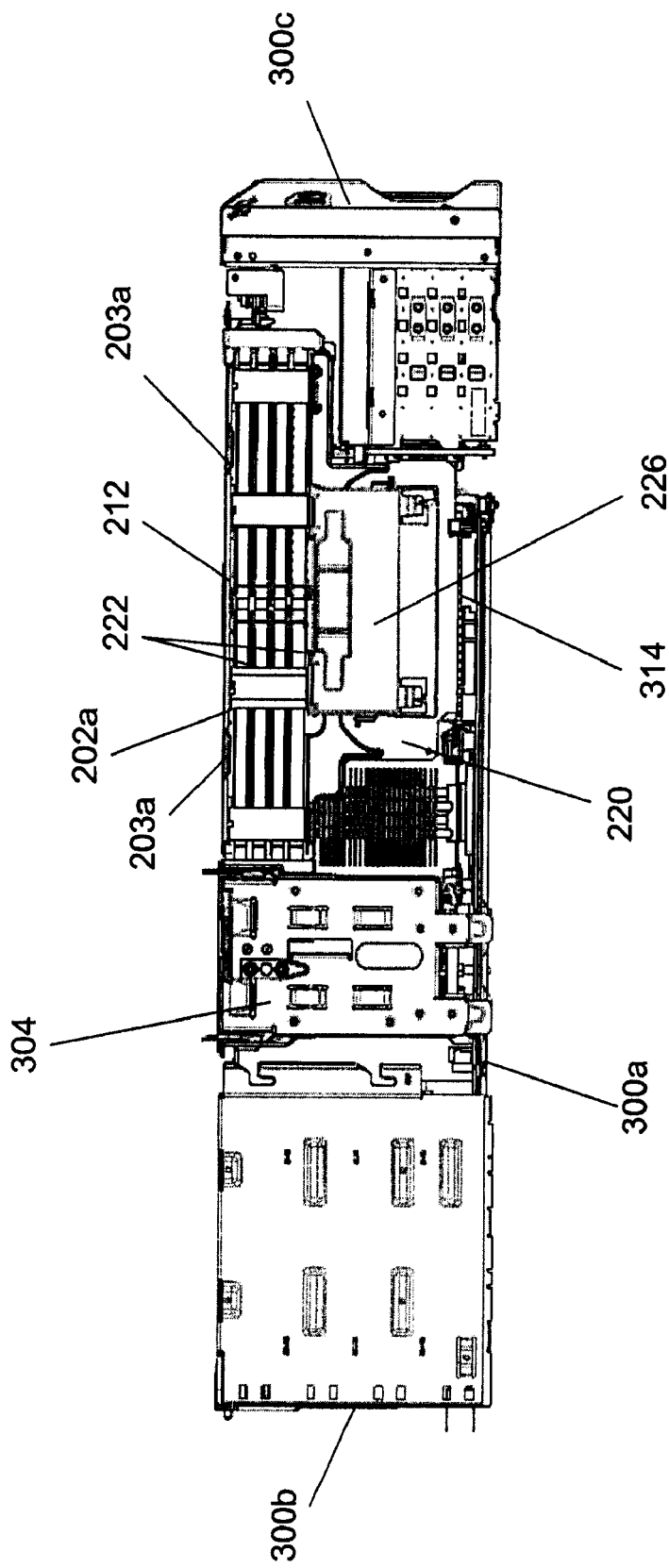
FIG. 4f is a cross-sectional view illustrating an embodiment of the carrier chassis of FIGS. 2a, 2b, 2c, 2d, and 2e coupled to the IHS chassis of FIGS. 3a, 3b, 3c, 3d, and 3e.

A plurality of carrier chassis 200 may be coupled to the IHS chassis 300 and their board connectors 220a mated with IHS connectors 314 in the IHS housing 302 in the same manner as discussed above, as illustrated in FIG. 4e. In an embodiment, when a plurality of carrier chassis 200 are coupled to the IHS chassis 300, the directing surface 226a on the shroud 226 of a carrier chassis 200 may operate to guide and direct the carrier chassis 200 into an appropriate volume in the IHS housing 302 by engaging other carrier chassis 200. In an embodiment, when the carrier chassis 200 are coupled to the IHS chassis 300 such that their board connectors 220a are mated with the IHS connectors 314, the top wall 212a of each handle 212 is flush with the carrier wall 202a, and each of the carrier walls 202a and top walls 212a of the handles 212 are substantially co-planar and located in the IHS housing 302 such that no portion of the carrier chassis 200 extends out of the IHS housing 302, as illustrated in FIGS. 4e and 4f. Positioning all the user interaction points on the carrier chassis 200 flush with the IHS chassis 300 provides space savings and increased system density over conventional systems.

In an embodiment, if the user wishes to remove a carrier chassis 200 from the IHS chassis 300, the user may actuate the handle retaining mechanism 218 such that the springs 216 cause the handle 212 to extend from the carrier wall 202a. The user may then grasp the top wall 212a of the handle 212 and pull it away from the carrier wall 202a such that the rack arms 212b and 212c cause a rotation of the pinion cams 204a and 204b (due to the engagement of the rack teeth 214 and the cam teeth 208) that provides an extraction force assist to the user due to the engagement of the camming posts 316 and the pinion cams 204a and 204b. When the carrier chassis 200 reaches the uncammed orientation B, the board connector 220a is unmated with the IHS connector 314 and the user may use the handle 212 to lift the carrier chassis 200 out of the IHS housing 302.

Thus, a memory carrier and IHS coupling system have been described that provide a carrier for fitting a relatively large number of memory modules in an IHS chassis while providing the high insertion forces necessary to mate the memory modules to connectors in the IHS chassis. The carrier optimizing the volume used to couple and mate the memory modules with the IHS by providing a camming system that uses relatively little volume in the IHS chassis and storing user touchpoints flush with the surfaces of the carrier and the IHS chassis when they are not needed.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A memory carrier system, comprising:
   a carrier chassis that includes a board having a board connector, wherein the board is operable to couple to a plurality of memory modules;
   a pair of pinion cams that are rotatably mounted to the carrier chassis; and
   a handle that is moveably coupled to the carrier chassis and includes a pair of rack arms, wherein each rack arm engages a respective pinion cam;
   wherein the carrier chassis is operable to be positioned in an information handling system (IHS) chassis that includes an IHS connector, and the handle is operable to be moved relative to the carrier chassis in order to rotate the pinion cams into an engagement with the IHS chassis that provides a cam force that mates the board connector to the IHS connector.

2. The system of claim 1, wherein the carrier chassis includes a chassis wall, and the handle and pinion cams are operable to move between an uncammed orientation and a cammed orientation, and wherein the handle extends from the chassis wall in the uncammed orientation, and wherein the handle is flush with the chassis wall in the cammed orientation.

3. The system of claim 2, wherein the handle is resiliently biased to extend from the chassis wall.

4. The system of claim 3, further comprising:
   a handle retaining member that is operable to retain the handle such that the handle is flush with the chassis wall.

5. The system of claim 1, further comprising:
   a cam lockout mechanism that is operable to engage the pinion cams to prevent rotation of the pinion cams relative to the carrier chassis, wherein the cam lockout mechanism is operable to disengage the pinion cams upon engagement with the IHS chassis to allow rotation of the pinion cams relative to the carrier chassis.

6. The system of claim 1, wherein the pinion cams are located in a spaced apart orientation from each other on the carrier chassis such that when handle is moved relative to the carrier chassis in order to rotate the pinion cams, the pinion cams rotate in opposite directions.

7. The system of claim 1, wherein the carrier chassis defines a camming post channel adjacent each pinion cam.

8. The system of claim 7, further comprising:
   a cam channel defined by each pinion cam, wherein each cam channel includes a cam channel entrance; and
   a cam lockout mechanism that is operable to engage the pinion cams to prevent rotation of the pinion cams relative to the carrier chassis when the cam channel entrance on each pinion cam is located adjacent a respective camming post channel such that a camming post may enter the cam channel through the camming post channel, wherein the cam lockout mechanism is operable to disengage the pinion cams upon engagement with the IHS chassis to allow rotation of the pinion cams relative to the carrier chassis such that the cam channel entrance is spaced apart from the camming post channel.

9. An information handling system (IHS), comprising:
an IHS chassis that houses a processor and an IHS connector that is coupled to the processor, wherein the IHS chassis includes a pair of camming posts located adjacent the IHS connector;
a carrier chassis that is located in the IHS chassis and includes a board having a board connector that is mated with the IHS connector;
a plurality of memory modules coupled to the board;
a pair of pinion cams that are rotatably mounted to the carrier chassis and that each engage a respective camming post; and
a handle that is moveably coupled to the carrier chassis and includes a pair of rack arms, wherein each rack arm engages a respective pinion cam, and wherein the handle has been moved relative to the carrier chassis in order to rotate the pinion cams into an engagement with the camming posts that provided a cam force that mated the board connector to the IHS connector.

10. The system of claim 9, wherein the carrier chassis includes a chassis wall, and the handle and pinion cams are operable to move between an uncammed orientation and a cammed orientation, and wherein the handle extends from the chassis wall in the uncammed orientation, and wherein the handle is flush with the chassis wall in the cammed orientation.

11. The system of claim 10, wherein the handle is resiliently biased to extend from the chassis wall.

12. The system of claim 11, further comprising:
a handle retaining member that is operable to retain the handle such that the handle is flush with the chassis wall.

13. The system of claim 9, further comprising:
a cam lockout mechanism that is operable to engage the pinion cams to prevent rotation of the pinion cams relative to the carrier chassis, wherein the cam lockout mechanism is operable to disengage the pinion cams upon engagement with the IHS chassis to allow rotation of the pinion cams relative to the carrier chassis.

14. The system of claim 9, wherein the pinion cams are located in a spaced apart orientation from each other on the carrier chassis such that when handle is moved relative to the carrier chassis in order to rotate the pinion cams, the pinion cams rotate in opposite directions.

15. The system of claim 9, wherein the carrier chassis defines a camming post channel adjacent each pinion cam.

16. The system of claim 15, further comprising:
a cam channel defined by each pinion cam, wherein each cam channel includes a cam channel entrance; and
a cam lockout mechanism that is operable to engage the pinion cams to prevent rotation of the pinion cams relative to the carrier chassis when the cam channel entrance on each pinion cam is located adjacent a respective camming post channel such that a camming post may enter the cam channel through the camming post channel, wherein the cam lockout mechanism is operable to disengage the pinion cams upon engagement with the IHS chassis to allow rotation of the pinion cams relative to the carrier chassis such that the cam channel entrance is spaced apart from the camming post channel.

17. A method for coupling a carrier chassis to an information handling system (IHS), comprising:
providing an IHS chassis that houses a processor and an IHS connector that is coupled to the processor, wherein the IHS chassis includes a pair of camming posts located adjacent the IHS connector;
positioning a carrier chassis in the IHS chassis such that the camming posts move through respective camming post channels defined by the carrier chassis and enter respective cam channels defined by respective pinion cams that are moveably coupled to the carrier chassis; and
moving a handle that is coupled to the carrier chassis relative to the carrier chassis, wherein the moving the handle rotates the pinion cams relative to the carrier chassis through the engagement of a pair of rack arms on the handle with the pinion cams, and wherein the rotating of the pinion cams moves the camming posts through the cam channels to provide a camming force that mates the IHS connector with a board connector that is located on a board that is coupled to the carrier chassis.

18. The method of claim 17, further comprising:
coupling a plurality of memory modules to the board.

19. The method of claim 17, further comprising:
retaining the handle such that the handle is flush with an outer chassis wall on the carrier chassis.

20. The method of claim 17, further comprising:
engaging a cam lockout mechanism on the carrier chassis with the IHS chassis in order to allow the pinion cams to rotate relative to the carrier chassis.

* * * * *